United States Patent
Siracusa

[19]

[11] Patent Number: 6,049,904
[45] Date of Patent: Apr. 18, 2000

[54] INSECT PROTECTIVE HEAD SCREEN ATTACHABLE TO A BASEBALL STYLE HAT

[76] Inventor: Peter Siracusa, 108 Teatown Rd., Croton-on-Hudson, N.Y. 10520

[21] Appl. No.: 09/234,533

[22] Filed: Jan. 21, 1999

[51] Int. Cl.[7] .................................................. A42B 1/04
[52] U.S. Cl. ........................... 2/4; 2/195.1; 2/202; 2/207; 2/209.13
[58] Field of Search ................... 2/4, 195.1, 202, 2/207, 209.13, 9, 181, 181.2, 181.4, 206, 424; D2/866

[56] References Cited

U.S. PATENT DOCUMENTS

| | | | |
|---|---|---|---|
| 281,502 | 7/1883 | Harvey | 2/4 |
| D. 346,893 | 5/1994 | St-Germain | D2/866 |
| 499,965 | 6/1893 | Bushnell | 2/4 |
| 599,686 | 3/1898 | Conlisk . | |
| 1,004,507 | 9/1911 | Walz | 2/4 |
| 1,780,801 | 11/1930 | Shlenker . | |
| 2,434,873 | 1/1948 | Tessier . | |
| 2,472,033 | 5/1949 | Wetzel . | |
| 2,784,409 | 3/1957 | Slipakoff . | |
| 3,881,198 | 5/1975 | Waters . | |
| 4,214,318 | 7/1980 | Gomez . | |
| 5,091,993 | 3/1992 | Merrill et al. . | |
| 5,153,943 | 10/1992 | Clement . | |
| 5,367,706 | 11/1994 | Davidson . | |
| 5,493,732 | 2/1996 | Fawkes . | |
| 5,542,127 | 8/1996 | Bezanis . | |
| 5,623,732 | 4/1997 | Olajide, Jr. . | |
| 5,713,076 | 2/1998 | Davis . | |
| 5,790,986 | 8/1998 | Hall . | |

*Primary Examiner*—Diana Oleksa
*Attorney, Agent, or Firm*—McGlew and Tuttle, P.C.

[57] ABSTRACT

A flexible fiberglass mesh head screen with a cylindrical shape and sewn at the top and back with the bottom open to be placed over the wearer's head to protect the head and neck from insects. It is designed to be worn over a baseball style cap or hat. It attaches to the button on top of the baseball hat by an elastic strip sewn to the inside top of the head screen. This keeps the head screen firmly on the wearer's head.

16 Claims, 2 Drawing Sheets

和,049,904

INSECT PROTECTIVE HEAD SCREEN ATTACHABLE TO A BASEBALL STYLE HAT

FIELD OF THE INVENTION

The present invention relates to a protective head covering which can easily be attached to and removed from almost any baseball style cap or hat. When it is attached it remains firmly on the wearer's head regardless of how active the person may be.

BACKGROUND OF THE INVENTION

Baseball style hats are very popular and the hat of choice of most individuals who venture outdoors in the warmer months. Those who spend time in wooded areas, fields, gardens or around lakes and streams have experienced annoying flying insects and the discomfort they bring. Chemical repellents have an odor and are limited in their effectiveness. Also, some users may be allergic to them. Some insect protective head gear can be cumbersome, loose fitting and uncomfortable to wear or require a special head piece to accompany it as well as a separate carrying case.

U.S. Pat. No. 2,472,033 to E. W. Wetzel is for a full brim sportsman's hat in which the screen is a permanent part of the hat and is rolled up into the brim when not in use.

U.S. Pat. No. 4,214,318 to M. D. Gomez describes a portable roll up bug netting comprised of a plastic material which has a band on the upper edge. The netting is attached by securing a band around the hat crown.

U.S. Pat. No. 5,713,076 to M. Davis describes a head piece having a crown and a brim with the outer edge extending part of the way around the crown and a transparent eyepiece attached to the outer edge of the brim.

U.S. Pat. No. 5,367,706 to Davidson describes a cylindrical fabric mesh head net with integral hoops designed to keep the fabric away from the wearer's face.

None of the above patents disclose a head screen that can easily be attached to and removed from the top of a baseball style hat.

An insect protective head screen, if it is to be acceptable to the wearer, must not only be effective in preventing insects from contacting the wearer's head and neck, but it must be comfortable and remain firmly on the wearer's head and convenient to apply, remove and transport.

SUMMARY AND OBJECTS OF THE INVENTION

The primary object of the present invention is to provide a high degree of protection against insects by keeping the head screen secure to the wearer's head by means of its attachment to the top of a baseball style hat of the wearer's choice.

The present invention attains this object with a head screen constructed of mesh fiberglass screening such as that found in windows of most homes. It is cylindrical in shape and sewn across the top and back with the bottom open. When placed on the wearer's head it extends from the top of the head to the top of the shoulders. There is a draw string on the bottom. There is an elastic strip sewn into the inside top seam which allows it to be attached to the button on top of most baseball style caps or hats. This keeps the head screen firmly on the hat which is firmly on the wearer's head. It can be easily unattached. The fiberglass screening is durable and rigid enough to keep its intended shape and not cling to the wearer's face, yet it is flexible and can be compacted to a small size for easy transporting. The color is black to minimize the suns glare to the wearer.

The above-mentioned features of the present invention and the features explained below may be used not only in the described combinations, but the features can also be used individually and/or in other combinations within the scope of the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
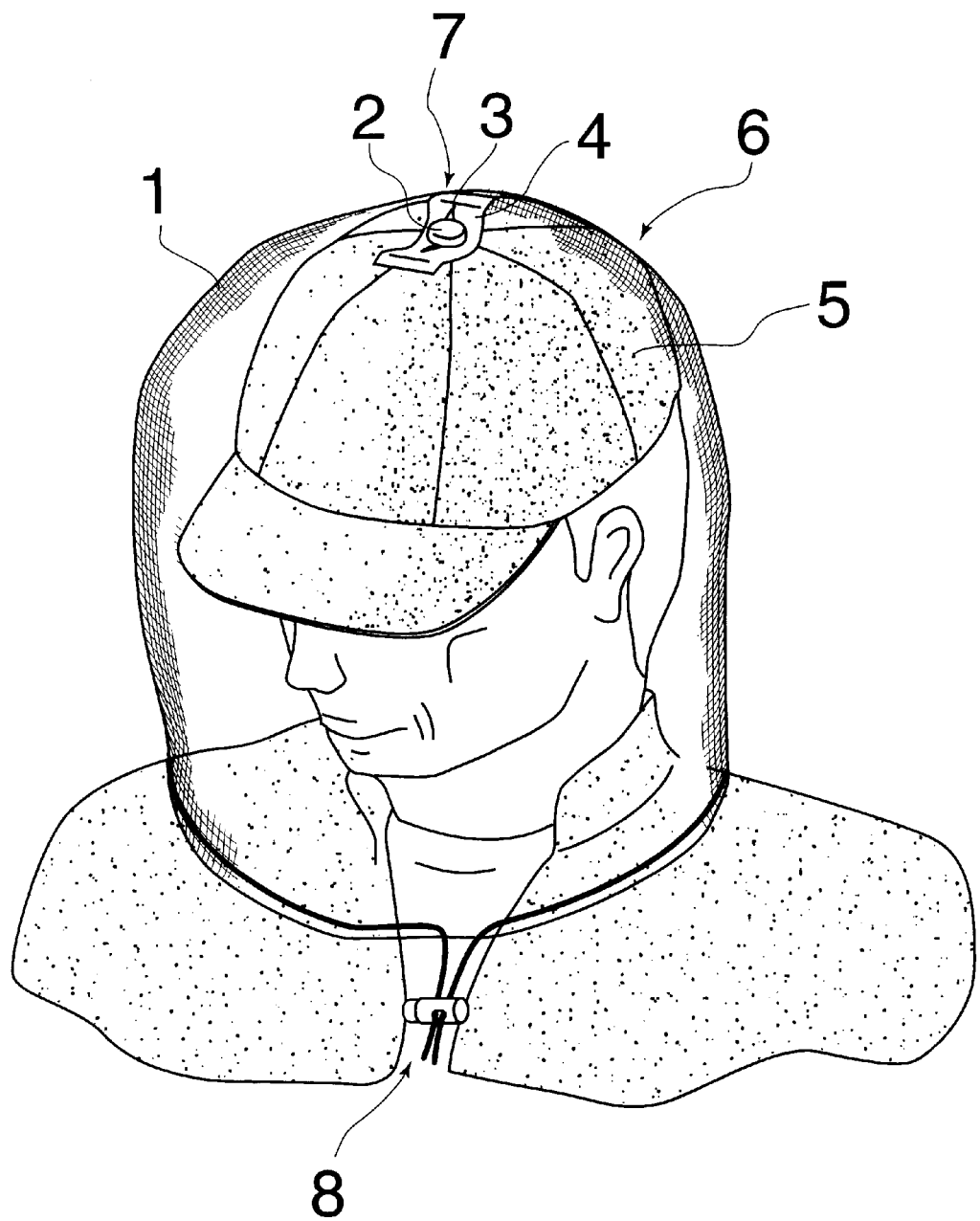
FIG. 1 is a perspective view of the invention in which the head screen fits over a baseball style hat with an elastic strip sewn to the top inside of the head screen and attaching to a button on top of the hat by means of a button hole in the elastic strip.
Figure 2:
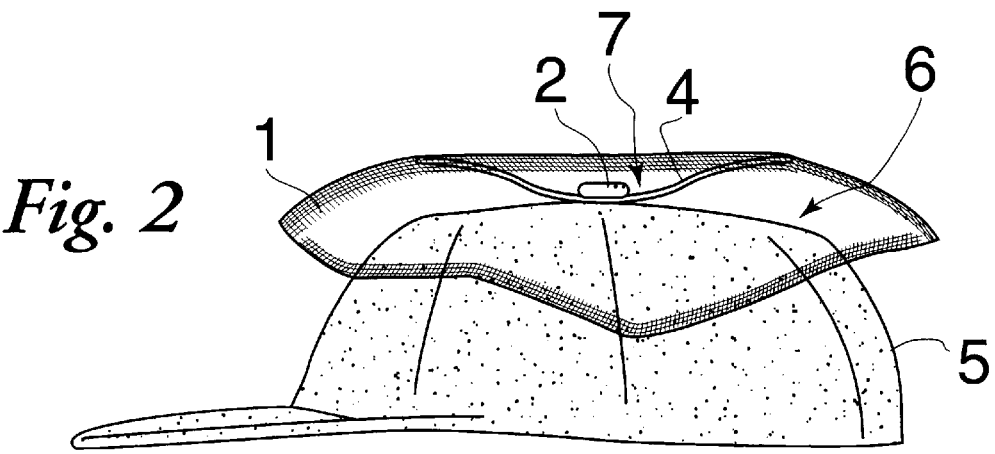
FIG. 2 is a side view showing the attachment of the head screen to the button on top of the hat.
Figure 3:
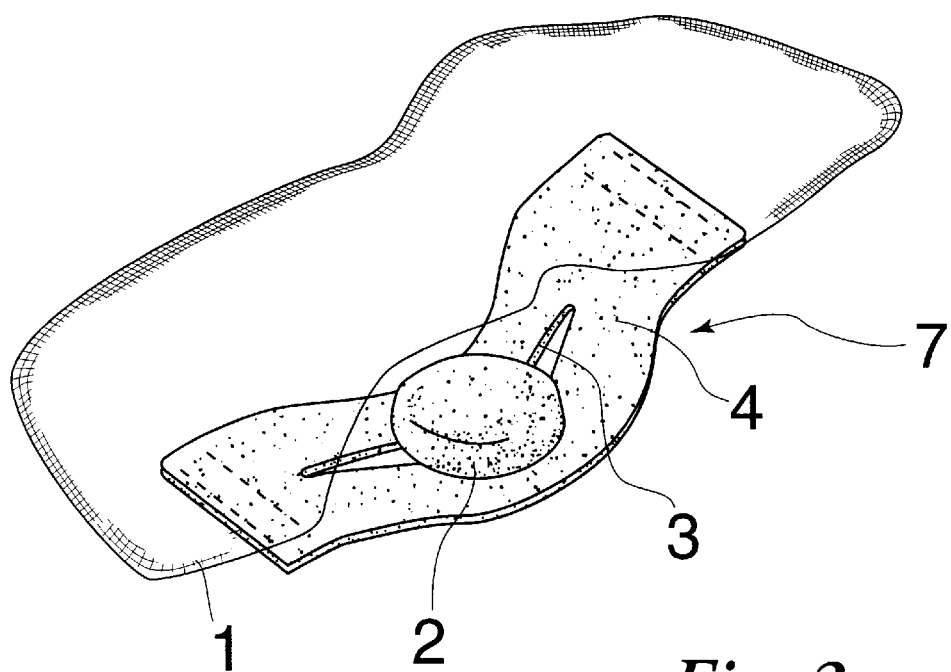
FIG. 3 is an enlarged view of the elastic strip, with the button hole, which is sewn to the top of the head screen and is placed over the button on top of the hat.

Referring to the drawings, especially FIG. 1, the present invention is a head screen constructed of a mesh fiberglass screen material 1 similar to that used in window screens found in most homes. The shape is substantially cylindrical, which includes other shapes used depending on the application or situation to be encountered by the user. One end of the cylindrical shape is open and the other end is closed. The cylindrical shape can be formed from a sheet of screen material by forming seams at a top and back of the head screen.

An attachment means 6 is positioned at the closed end of the screen material for attaching to a head of the user. The attachment means 6 preferably includes a baseball style hat 5 and a fastening means 7 for fastening the closed end of the cylindrical shape to a top of the baseball style hat 5. The baseball hat 5 is positioned inside the cylindrical shape and fastened to the closed end of the screen material 1. The fastening means 7 is preferably a button hole means for fastening the closed end of the cylindrical shape to a button 2 on the baseball hat 5. The button is positioned in a center top portion of said hat which allows the cylindrical shape to be substantially symmetrical for most applications.

The scope of the present invention also includes an embodiment where the attachment means 6 just includes the fastening means 7. In this embodiment, the baseball hat 5 is provided separately by the user.

The button hole means includes an elastic strip 4 attached to the inside top, or closed end, of the screen material 1. The elastic strip 4 defines a button hole or slit 3. The slit 3 slips over the button 2 on top of any baseball style hat 5 to keep the screen material firmly on the user's head.

A collar means 8 can be arranged at the open end of the screen material 1 for fastening the open end of the screen material 1 to a collar of a shirt of the user. The collar means 8 includes a draw string tightenable around the collar of the shirt of the user.

The features described in the specification, drawings, abstract, and claims, can be used individually and in arbitrary combinations for practicing the present invention.

While specific embodiments of the invention have been shown and described in detail to illustrate the application of the principles of the invention, it will be understood that the invention may be embodied otherwise without departing from such principles. Other embodiments being as an example, different hat styles and different types of fastening means connecting to a closed end of cylindrically shaped screen material.

What is claimed is:

1. An insect protective head screen comprising:

a screen material formed into a substantially cylindrical shape with an open end and a closed end;

attachment means arranged at said closed end of said screen material for attaching to a head of a user, said attachment means includes a buttonhole means for attaching to a button arranged on the head of the user.

2. A head screen in accordance with claim 1, wherein:

said buttonhole means includes an elastic material fastened to said screen material and defining a slit for receiving the button.

3. A head screen in accordance with claim 1, wherein:

said attachment means includes a hat wearable by the user and said buttonhole means fastens to a center top portion of said hat.

4. A head screen in accordance with claim 3, wherein:

said hat is positioned inside said cylinder shape and adjacent said closed end of said screen material.

5. A head screen in accordance with claim 2, wherein:

said hat has a bill which extends over eyes of the user and holds said screen material away from a face of the user.

6. A head screen in accordance with claim 3, wherein:

said hat includes the button on a top outside portion of said hat, and said button is positioned in a center top portion of said hat, said hat is a baseball style hat, said hat is positioned inside said cylinder shape and adjacent said closed end of said screen material, said hat has a bill which extends over eyes of the user and holds said screen material away from a face of the user;

said buttonhole means includes an elastic material fastened to said screen material and defining a slit receiving said button.

7. A head screen in accordance with claim 1, wherein:

said attachment means includes a hat wearable by the user, said hat including the button on a top outside portion of said hat.

8. A head screen in accordance with claim 7, wherein:

said button is positioned in a center top portion of said hat.

9. A head screen in accordance with claim 7, wherein:

said hat is a baseball style hat.

10. A head screen in accordance with claim 1, further comprising:

collar means arranged at said open end of said screen material and for fastening said open end of said screen material to a collar of a shirt of the user.

11. A head screen in accordance with claim 10, wherein:

said collar means includes a draw string tightenable around the collar of the shirt of the user.

12. An insect protective head screen comprising:

a screen material formed into a substantially cylindrical shape with an open end and a closed end;

attachment means arranged at said closed end of said screen material for attaching to a head of a user, said attachment means includes a fastening means for fastening to a center top portion of a hat.

13. A head screen in accordance with claim 12, wherein:

said fastening means is repetitively attachable and detachable to the hat without substantially damaging either said fastening means or the hat.

14. A head screen in accordance with claim 12, wherein:

said attachment means includes the hat.

15. An insect protective head screen comprising:

a screen material formed into a substantially cylindrical shape with an open end and a closed end;

attachment means arranged at said closed end of said screen material for attaching to a head of a user, said attachment means includes a fastening means for fastening to a button on a top portion of a hat.

16. A head screen in accordance with claim 15, wherein:

said attachment means includes the hat and said button is on an outside of said hat.

* * * * *